United States Patent [19]

Miller

[11] 3,905,971

[45] Sept. 16, 1975

[54] 2-PHENYL-AS-TRIAZINE-3,5(2H,4H)DIONES

[75] Inventor: Max W. Miller, Stonington, Conn.

[73] Assignee: Pfizer Inc., New York, N.Y.

[22] Filed: May 29, 1973

[21] Appl. No.: 364,672

Related U.S. Application Data

[63] Continuation-in-part of Ser. No. 129,139, March 29, 1971, abandoned, which is a continuation-in-part of Ser. No. 78,917, Oct. 7, 1970, abandoned, which is a continuation-in-part of Ser. No. 768,191, Oct. 16, 1968, abandoned.

[52] U.S. Cl..............260/247.5 C; 260/247.1 M; 260/248 AS; 260/243 B

[51] Int. Cl.² ............. C07D 253/06; C07D 265/30
Field of Search............260/248 AS, 247.5 C, 260/247.1 M, 243 B

[56] References Cited
UNITED STATES PATENTS 3,560,496   2/1971   Howes et al. .................. 260/248

*Primary Examiner*—John M. Ford
*Attorney, Agent, or Firm*—Connolly and Hutz

[57]   ABSTRACT

2-Phenyl-as-triazine-3,5(2H,4H) diones and novel 2-substituted-phenyl-as-triazine-3,5(2H,4H) diones and their use as agents, for the control of coccidiosis are described.

27 Claims, No Drawings

2-PHENYL-AS-TRIAZINE-3,5(2H,4H)DIONES

CROSS REFERENCE TO RELATED APPLICATIONS

This application is a continuation-in-part of copending application Ser. No. 129,139, filed Mar. 29, 1971 now abandoned, which in turn is a continuation-in-part of copending application Ser. No. 78,917, filed Oct. 7, 1970 now abandoned, which in turn is a continuation-in-part of application Ser. No. 768,191, filed Oct. 16, 1968 now abandoned.

BACKGROUND OF THE INVENTION

Coccidiosis, a protozoan infection in young poultry, is known to have far-reaching economic effects. It is characterized by intestinal disorders, anemia, hemorrhage, and general unthriftiness. Two types of coccidiosis are known—the first, cecal, is caused by the coccidium *Eimeria tenella* and is characterized by severe hemorrhage on or about the fifth day after infection. The second type, intestinal, is caused by various species of Eimeria, namely, the *E. acervulina*, *E. necatrix*, *E. maxima*, *E. hagani*, *E. mitis*, *E. praecox*, and *E. brunetti*.

Extensive investigations into methods for controlling coccidiosis have led to the development of a wide variety of structural types of compounds such as sulfur, sulfa drugs, arsenicals, dihydro-1,3,5-triazines (U.S. Pat. No. 2,823,161); 3-amino-as-triazine complexes with substituted ureas (U.S. Pat. No. 2,731,385); 1-phenyl-3-(3-as-triazinyl) ureas (U.S. Pat. No. 2,762,743); 5-fluorouracil (U.S. Pat. No. 3,017,322); and astriazine-3,5(2H,4H)dione (U.S. Pat. No. 2,956,924) as coccidiostats.

The available agents are not completely satisfactory for the control of coccidiosis for one or more reasons. Many of these agents are relatively toxic and/or exhibit a low order of activity or possess a rather limited anticoccidial spectrum. Their effectiveness in suppressing or preventing the disease is frequently not high, and the high dosage levels required place an undue economic burden on the poultry grower.

SUMMARY OF THE INVENTION

It has now been found that a series of 2-phenyl-as-triazine3,5(2H,4H) diones having the general formula:

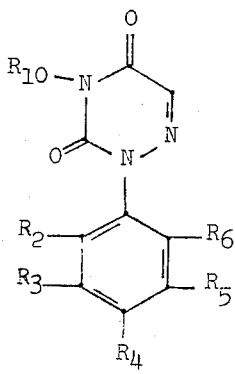

and the alkali metal, alkaline earth metal and amino salts thereof wherein:

each of $R_2$ and $R_6$ is hydrogen, fluoro, chloro, cyano, or methyl; with the proviso that at least one of $R_2$ and $R_6$ is hydrogen or fluoro;

each of $R_3$ and $R_5$ is hydrogen, cyano, trifluoromethyl, halogen, lower alkyl, lower alkoxy, lower alkylthio, or nitro;

$R_4$ is

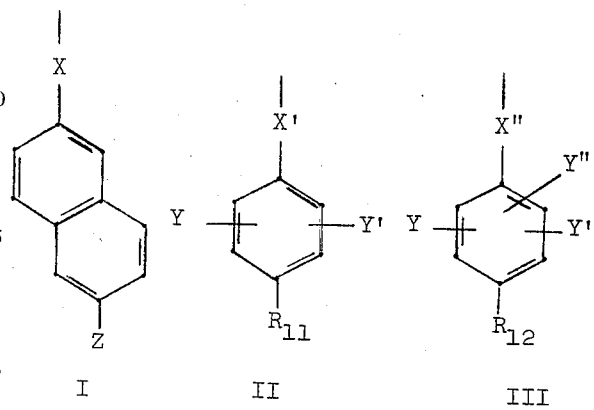

or $-CH_2-NR_{13}R_{14}$ wherein Z is hydrogen, lower alkylthio, or halogen;

Y, Y' and Y'' are each hydrogen, halogen, lower alkyl, or trifluoromethyl;

X is oxygen, sulfur, or $-OCH_2-$;

X' is $-OCH_2-$, $-SCH_2-$, $-SOCH_2-$, $-SO_2CH_2-$, or $-CH_2-$, $-OCH_2-CO-$,

$X''$ is oxygen, sulfur, SO, $SO_2$, >C=O, or $-CHOH-$;

$R_{10}$ is hydrogen;

$R_{11}$ is hydrogen, halogen, lower alkylthio, lower alkylsulfinyl, lower alkylsulfonyl, lower alkoxy, trifluoromethyl, or nitro;

$R_{12}$ is lower alkylthio, lower alkylsulfinyl, lower alkylsulfonyl, trifluoromethyl, lower alkanoyl or $SO_2NRR_1'$ wherein R is hydrogen, lower alkyl, allyl, propargyl, phenyl, benzyl, p-chlorophenyl, β-hydroxyethyl, β-acetoxyethyl, β-methoxyethyl, β-methylthioethyl, β-methylsulfonylethyl, or cyclopropyl;

$R_1'$ is hydrogen, lower alkyl, allyl, propargyl, β-hydroxyethyl, β-acetoxyethyl, β-methoxyethyl, β-methylthioethyl, β-methylsulfonylethyl, γ-(β-methoxyethoxy)-propyl, cyclopropyl, or cyclopentyl;

and wherein R and $R_1'$ when taken together with the nitrogen to which they are attached complete a morpholino or pyrrolidino ring; and $R_{13}$ and $R_{14}$ taken together with the nitrogen to which they are attached complete a morpholino, thiomorpholino, or thiazolidino ring;

are highly effective in controlling coccidiosis when orally administered in small doses to poultry. The terms "control" and "controlling" —as used herein— are intended to include the treatment, that is, the alleviation of symptoms of established coccidial infections of poultry, as well as the prevention (prophylaxis) of infection. However, because of the rapid clinical course of coccidial infections, the principal interest in these compounds resides in their use for the prevention of such infections.

The terms "lower alkyl," "lower alkoxy," "lower alkylthio," "lower alkylsulfinyl," and "lower alkylsulfonyl" —as used herein— are intended to include alkyl, alkoxy, alkylthio, alkylsulfinyl, and alkylsulfonyl groups having from 1 to 6 carbon atoms.

Of the variety of isomeric, homologous and analogous phenyl-as-triazine-3,5(2H,4H)diones described in the art, it is the herein described 2-phenyl-as-triazine-3,5-(2H,4H) diones that are especially effective as agents for the control of coccidiosis. The isomeric 4- and 6-phenyl-as-triazine-3,5(2H,4H) diones are less effective as coccidiostats than are the 2-phenyl derivatives of the above formula.

A preferred group of novel compounds of this invention is that in which $R_4$ is of the formula:

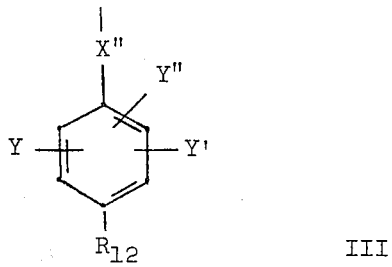

III wherein $X''$ is oxygen and the other substituents are as previously defined.

Within this group, compounds wherein $X''$ is oxygen, compounds wherein $R_{12}$ is —SCH$_3$ are preferred and the compound wherein $R_2$, $R_6$, Y, and Y' are each hydrogen, $R_3$ and $R_5$ are each methyl, and Y'' is meta-methyl is especially preferred.

Another preferred group of compounds wherein $R_4$ is of formula III is that in which $X''$ is oxygen and $R_{12}$ is —SO$_2$NRR$_1$'. Especially preferred is the case in which R and $R_1$' are each lower alkyl. One especially preferred compound within this subgroup is that in which R, $R_1$', $R_2$ and $R_6$ are each hydrogen; $R_5$, Y, Y', and Y'' are each methyl; and $R_3$ is chloro. Another especially preferred compound of this subgroup is that in which R is methyl, $R_1$' is ethyl; $R_2$, $R_6$, Y', and Y'' are each hydrogen; $R_3$ is chloro; Y is ortho-chloro; and $R_5$ is methyl. Another especially preferred compound within this subgroup is that in which R, $R_5$, Y, Y', and Y'' are each methyl; $R_1$' is ethyl; $R_3$ is chloro; and $R_2$ and $R_6$ are each hydrogen. Another preferred compound within this subgroup is that in which R and $R_1$' are each ethyl; $R_2$ and $R_6$ are each hydrogen; and $R_3$, $R_5$, Y, Y', and Y'' are each methyl.

Preferred novel compounds of this invention wherein $R_4$ is of formula III and $R_{12}$ is —SO$_2$NRR$_1$' include compounds wherein:

1. R is hydrogen; $R_1$' is cyclopropyl; $R_2$, $R_6$, Y', and Y'' are each hydrogen; $R_3$ is chloro; Y is ortho-chloro; and $R_5$ is methyl;

2. R, $R_2$, $R_6$, and Y'' are each hydrogen; $R_1$' is cyclopropyl; and $R_3$, $R_5$, Y and Y' are each meta-methyl;

3. R is β-methoxyethyl; $R_1$', $R_2$, and $R_6$ are each hydrogen; $R_5$, Y, Y', and Y'' are each methyl; and $R_3$ is chloro;

4. R is β-methylthioethyl; $Rr_1$', $R_2$ and $R_6$ are each hydrogen; and $R_3$, $R_5$, Y, Y', and Y'' are each methyl.

5. R is methyl; $R_1$' is ethyl; $R_3$ is chloro; $R_5$ is methyl; Y is ortho ethyl; and $R_2$, $R_6$, Y', and Y'' are each hydrogen.

Another preferred group of compounds is that in which $R_4$ is of formula III, $X''$ is oxygen, and $R_{12}$ is —COCH$_3$. An especially preferred compound in this group is that in which $R_3$ is chloro; $R_5$ is methyl; and $R_2$, $R_6$, Y, Y', and Y'' are each hydrogen.

Another preferred group of novel compounds of this invention are those wherein $R_4$ is of the structure:

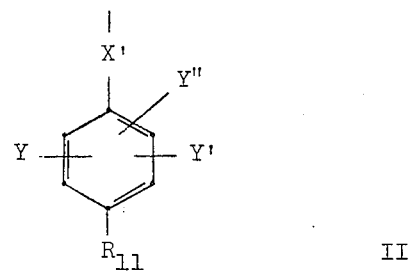

II

A preferred group within this group of compounds is that in which X' is —OCH$_2$—. An especially preferred subgroup within this group is that wherein $R_3$ is hydrogen or lower alkyl, $R_5$ is lower alkyl or halogen, Y, Y', and Y'' are each hydrogen, halogen or lower alkyl and $R_{11}$ is halogen or —SO$_2$CH$_3$—.

Another preferred group of novel compounds of this invention is that wherein $R_4$ is of the structure:

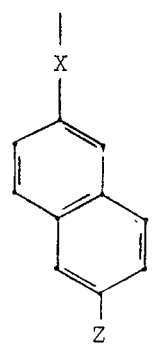

wherein: X is oxygen or sulfur and Z is halogen. An especially preferred compound of this group is that wherein X is oxygen; Z is bromo; $R_2$, $R_3$, and $R_6$ are each hydrogen; and $R_5$ is chloro.

A final preferred group of novel compounds of this invention is that wherein $R_4$ is of the formula:

$$-CH_2-NR_{13}R_{14}$$

An especially preferred compound within this group is that wherein $R_2$ and $R_6$ are each hydrogen, $R_3$ and $R_5$ are each methyl, and $R_{13}$ and $R_{14}$ together with the nitrogen to which they are attached complete a morpholino ring.

The compounds described herein may be administered to the poultry alone but are preferably administered in conjunction with a suitable inert carrier such as a nutritionally-balanced poultry feed. Although the preferred route of administration is the oral route, it is also possible to administer these coccidiostatic compounds via the rectum. The compounds can, of course, as those skilled in the art will recognize, also be administered via the drinking water.

Detailed Description of the Invention

The 2-phenyl-as-triazine-3,5(2H,4H) diones described herein are prepared by methods such as are described by Slouka, Monatsh. Chem. 96, 134–137 (1965), which comprises decarboxylation of the corresponding 6-carboxy derivatives. The requisite 6-carboxy acid derivatives are obtained by acid hydrolysis of the corresponding cyano compounds which are, in turn, prepared according to the procedure of Slouka, Monatsh. Chem. 94, 258–262 (1963). This method comprises reaction of the appropriate phenyl diazonium salt with cyanoacetylurethan to provide the corresponding phenylhydrazono-cyanoacetylurethan which, under the influence of alkali or sodium acetate-acetic acid or ammonium acetate-acetic acid, produces the 6-cyano compound which is hydrolyzed to the carboxy acid under acid or alkaline conditions.

The necessary reactants, that is, the appropriately substituted anilines of the formula

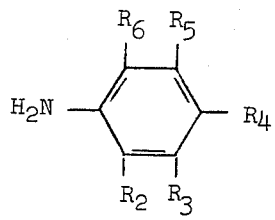

wherein the R variables are as defined above which are converted to a diazonium salt and reacted with cyanoacetylurethan as described above. If not commercially available, such anilines are accessible by methods known to those skilled in the art. A number of alternative routes to the final products of formula I are frequently at one's disposal. To illustrate: compounds of formula I wherein $R_4$ is

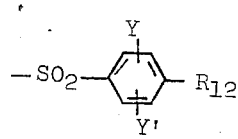

(the other R variables having the values given above) can be prepared as described herein (Slouka, loc. cit.) from formula II reactants wherein $R_4$ is

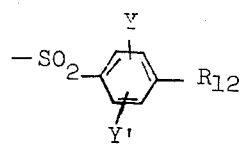

or

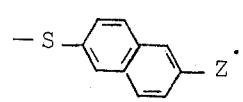

The use of the former reactant, of course, produces the desired compound of formula I. The latter reactant produces a thio derivative which is subsequently oxidized to the desired sulfonyl analog according to known methods; e.g., via hydrogen peroxide.

Those compounds of formula I wherein $R_4$ is

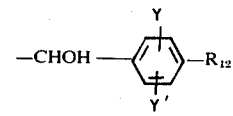

are prepared by reduction of the corresponding ketone derivatives

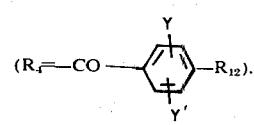

Sodium borohydride is an efficient reducing agent for the reduction of ketones of formula I wherein at least one of $R_3$ or $R_5$ is hydrogen. Ketone precursors in which each of $R_3$ and $R_5$ is other than hydrogen are reduced in similar fashion but using excess, three to four times, sodium borohydride and elevated temperatures, i.e., reflux.

The present agents may be orally administered to poultry in a suitable carrier therefor. It is generally convenient and, therefore, preferred to add the agents to the poultry feed so that a therapeutic dosage of the agent is ingested with the daily poultry ration. The agent may be added directly to the feed, as such, or in the form of a premix or concentrate. A premix or concentrate of therapeutic agent in a carrier is commonly employed for the inclusion of the agent in the feed. Suitable carriers are liquid or solid, as desired, such as water, various meals; for example, soybean oil meal, linseed oil meal, corncob meal, and mineral mixes such as are commonly employed in poultry feeds. A particularly effective carrier is the poultry feed itself; that is, a small portion of poultry feed. The carrier facilitates uniform distribution of the active materials in the finished feed with which the premix is blended. This is important because only small portions of the present potent agents are required. It is important that the compound be thoroughly blended into the premix and, subsequently, the feed. In this respect, the agent may be dispersed or dissolved in a suitable oily vehicle such as soybean oil, corn oil, cottonseed oil, and the like, or in a volatile organic solvent and then blended with the carrier. It will be appreciated that the proportions of active material in the concentrate are capable of wide variation since the amount of agent in the finished feed may be adjusted by blending the appropriate proportion of premix with the feed to obtain a desired level of therapeutic agent.

High potency concentrates may be blended by the feed manufacturer with proteinaceous carriers such as soybean oil meal and other meals, as described above, to produce concentrated supplements which are suitable for direct feeding to poultry. In such instances, the poultry is permitted to consume the usual diet. Alternatively, such concentrated supplements may be added directly to the poultry feed to produce a nutritionally balanced, finished feed containing a therapeutically effective level of one or more of the compounds of this invention. The mixtures are thoroughly blended by standard procedures, such as in a twin-shell blender, to ensure homogeneity. The finished poultry feed should contain roughly between 50 percent and 80 percent of grains, between 0 percent and 10 percent animal protein, between 5 percent and 30 percent vegetable protein, between 2 percent and 4 percent minerals, together with supplemental vitaminaceous sources.

It will, of course, be obvious to those skilled in the art that the use levels of the compounds described herein will vary under different circumstances. Continuous low-level medication during the growing period, that is, during the first 8 to 12 weeks for chickens, is an effective prophylactic measure. In the treatment of established infections, higher levels may be necessary to overcome the infection.

The coccidiostatic activity of the novel compounds of the present invention is demonstrated as follows:

Groups of five nine-day old Barred Rock Cross strain cockerels are fed a basal ration into which the test compound is incorporated at various concentrations. The basal ration, a commercial chick starter (Purina Commercial Chick Starter, available from the Ralston Purina Co., St. Louis, Missouri), having the following composition, is presented ad libitum to the chicks 24 hours before infection and continuously thereafter throughout the course of the tests.

| Basal Ration Composition | |
|---|---|
| Crude protein not less than | 18.0% |
| Crude fat not less than | 3.0% |
| Crude fiber not more than | 6.0% |
| Added minerals not more than | 3.5% | supplied by the following ingredients:

Meat and bone meal, fish meal, soybean meal, ground barley, ground oats, ground yellow corn, dehydrated alfalfa meal, wheat middlings, vitamin $B_{12}$ supplement, ethoxyquin (a preservative), animal fat preserved with BHA*, choline chloride, niacin, vitamin A supplement, riboflavin supplement, calcium pantothenate, D activated animal sterol, vitamin E supplement, menadione sodium bisulfite (source of vitamin K activity)**, calcium carbonate, low fluorine rock phosphate, iodized salt, manganese sulfate, manganous oxide, copper sulfate, zinc oxide.
*BHA = butylated hydroxyanisole
**menadione sodium bisulfite = 2-methyl-1,4-naphthaquinone sodium bisulfite Twenty-four hours after initiation of the medication, the chicks are inoculated orally with 200,000 sporulated cocysts (*Eimeria tenella*) and the average weight per bird per group determined. In addition, a group of ten chicks is fed the basal ration which contains more of the test compound (infected, untreated controls). A further group of 10 chicks serves as uninfected, untreated controls. The chicks are examined on the fifth and sixth day post-infection for signs of hemorrhage. On the eighth day post-infection, the average body weight per bird per group is determined, the birds necropsied, the cecum examined macroscopically, and a pathology index (average degree of infection [A.D.I.]) determined. Chicks which die prior to the fifth day post-infection are considered as toxic deaths. Those which die five days post-infection or later are considered as deaths due to disease. The efficacy of the test compound is judged by the prevention of mortality and by comparison of the pathologic index with that of the unmedicated infected controls. The degree of pathologic involvement at necropsy is expressed as the average degree based on the following scheme: 0 = no cecal lesions; 1 = slight lesion; 2 = moderate lesions; 3 = severe lesions; 4 = death.

The concentration of test compound in the feed which will produce normal weight gains relative to the uninfected, untreated controls and normal pathology relative to the infected, untreated controls, is referred to as the minimum effective concentration (MEC).

In this manner, the coccidiostatic activity of the compounds of this invention was determined, and the results of these determinations are reported in the appended examples.

The present compounds may be employed at substantially low levels in feeds for the prevention or treatment of coccidiosis. Generally, the feed compositions of the present invention comprise a minor amount of the 2-phenyl-as-triazine compounds of this invention and a major amount of a nutritionally balanced feed, as described above. Feed compositions containing as little as 0.0015 percent of the present agent are found to effectively combat coccidiosis. Large amounts of the agent, up to 0.1 percent and larger, may also be employed. Of course, concentrations of less than 0.0015 percent provide some control of the infections. The concentration range favored in feed compositions is from about 0.0015 percent to about 0.05 percent. The preferred range is from about 0.0015 percent to about 0.025 percent of the ration. When administered by incorporation into the drinking water, preferably as an alkali metal or alkaline earth metal salt, the herein-described compounds are used at levels one-half the dosage given above for feeds.

The present feed compositions and supplements may also contain other effective therapeutic agents, such as antibiotics, to promote growth and general health of the poultry; arsenicals, e.g., 4-hydroxy-3-nitrophenylarsonic acid, as a growth stimulant; as well as sulfa compounds which may increase the effectiveness of the present coccidiostats.

Additionally, compounds of the above formula wherein at least one of $R_3$, $R_4$ or $R_5$ is alkenyl, alkynyl, SCN, alkenyloxy, or alkenylthio; compounds wherein $R_4$ is —NHCH$_2$CH$_2$N(CH$_3$)$_2$ or —N(lower alkyl)—CH$_2$CH$_2$N(CH$_3$)$_2$; and compounds wherein at least one of the $R_3$ and $R_5$ is an alkanoyl or bulky substituent such as (lower alkyl)-sulfonyl, SO$_2$NRR$_1$ and

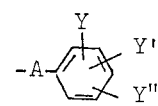

wherein A is —CR′=CR′—, CH$_2$, —CF$_2$— and X; R, R$_1$, X, Y and Y′ are as defined herein; Y″ is selected from the same values as is Y; and R′ is hydrogen and lower alkyl; are valuable agents for the prevention of coccidial infections. Also effective as coccidiostats are compounds of the formula I wherein R$_4$ is

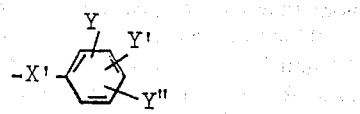

and wherein X' is —CHOH—, —CR'=CR'—, —CH$_2$— and CF$_2$—; and X, Y, Y' and Y'' are as defined herein; cycloalkanoyl of from 4 to 8 carbon atoms, alkanoyl of from 7 to 9 carbon atoms, SO$_2$NR'R'' wherein R' is hydrogen or lower alkyl; and R'' is hydrogen or alicyclic of 3 to 7 carbon atoms, substituted phenyl or substituted benzyl wherein the substituent is at least one of lower alkyl, lower alkoxy, halogen, nitro, cyano and trifluoromethyl; as well as the three thione analogs of the herein disclosed compounds. Also effective as coccidiostats are compounds of formula I wherein R$_{10}$ is lower alkyl or arylsulfenyl. Also effective as coccidiostats are compounds of formula I wherein X' or X'' is each a covalent bond,

—CH$_2$CH$_2$—, —C=C, —N(R')CH$_2$—, —CO—CH=CH; or —N=N—. Also effective as coccidiostats are compounds of formula I wherein R$_{11}$ is SO$_2$CF$_3$, lower alkanoyl, lower alkenyl, or lower alkinyl. Also effective as coccidiostats are compounds of formula I wherein X is —SO, —SO$_2$—,

—CHOH—, —NH, —OCH$_2$, >CH$_2$, —SCH$_2$, —SOCH$_2$—, and —SO$_2$CH$_2$—. Also effective as coccidiostats are compounds of formula I wherein Z is lower alkylthio, SCN, —SO$_2$CF$_3$, —CF$_3$, lower alkylsulfinyl, lower alkylsulfonyl, and —SO$_2$NRR$_1$'. Compounds of formula I represented by the formula:

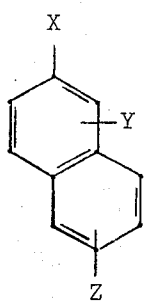

are also active as coccidiostats, as well as the three thione analogs of the herein disclosed compounds. Such compounds are prepared from appropriate reactants by methods described herein.

The following examples are illustrative and in no way limit the scope of the appended claims.

EXAMPLE I

A.
2,6-Dimethyl-4-Nitro-3'-Methyl-4'-Thiomethyl-Diphenylether

A solution of the sodium salt of 3-methyl-4-thiomethylphenol (15.4 g., 0.1 mole) in N,N-dimethylformamide (120 ml.) was added to a solution of 3,5-dimethyl-4-chloronitrobenzene (18.5 g., 0.1 mole) in N,N-dimethylformamide (50 ml.) at room temperature. The mixture was heated at 120° till the reaction was essentially complete (6–12 h). The resulting solution was concentrated in vacuo and poured onto water and stirred for 1–2 h. The precipitate was collected, washed with water and dried in vacuo (30.0 g). B. 2,6-Dimethyl-4-Amino-3'-Methyl-4'-Thiomethyl-Diphenylether To a stirring mixture of iron filings (60.0 g) in acetic acid (10 ml) and water (150 ml) heated on a steambath was added portionwise 2,6-dimethyl-4-nitro-3'-thiomethyl-diphenylether (15.15 g., 0.05 mole). After the addition was complete, the reaction mixture was heated for additional 2–3 hrs. The hot reaction mixture was neutralized with sodium bicarbonate and filtered. The filter cake was washed several times with water. This cake was extracted with hot ethanol and the organic extract was evaporated to yield a white solid (12.8 g.).

C. Ethyl
N-[Cyano-3,5-Dimethyl-4-(3-Methyl-4-Thiomethylphenoxy)Phenyl-Hydrazinylidine)Methylcarbonyl]Carbamate A 500 ml three-neck round-bottom flask was charged with 2,6-dimethyl-4-amino-3'-methyl-4'-thiomethylphenylether (4.6 g., 16.8 m. mole), water (150 ml) and concentrated hydrochloric acid (5.5 ml); the resulting mixture was heated on a steambath for 20 minutes and then cooled to 0°C. A solution of sodium nitrite (1.2 g in 20 ml of water) was added dropwise. The resulting yellow dizaoniumchloirde solution was then added dropwise to a stirred solution of cyanoacetylurethan (2.62 g., 16.8 m mole) in water (150 ml) containing pyridine (10 ml). The reaction mixture was stirred for 15–20 min. following completion of addition. The yellow precipitate which forms was removed by filtration, washed with water and dried (6.0 g).

D.
2-[3,5-Dimethyl-4-(3-methyl-4-Thiomethyl-Phenoxy)Phenyl]-6-Carboxy-as-Triazine-3,5(2H,4H)-Dione To a solution of acetic acid (37 ml) was added sodium acetate (1.2 g) and the carbamate described under "C" (6.4 g., 14.6 m mole). The mixture was heated at 120°C. for 5 hours. After cooling the solution to room temperature, concentrated hydrochloric acid (15 ml) was added to it and it was heated to reflux for 5–6 hours. It was cooled to room temperature, poured onto water and the precipitated solid was collected. The solid was washed with water and dried.

E.
2-[3-Chloro-4-(3-Methyl-4-Thiomethylphenoxy)Phenyl]-as-Triazine-3,5(2H,4H)-Dione The  2-[3,5-dimethyl-4-(3-methyl-4- thiomethylphenoxy)phenyl]-6-carboxy-as-triazine-3,5(2H,4H)-dione was decarboxylated by heating to 250°C. for 30 minutes in a round bottom flask fitted with a condenser and immersed in a Wood's metal bath.

The melt was then cooled and recrystallized from ethanol: M.P. = 133°–136°, MEC = 0.000019.

The following compounds were similarly prepared thiomethylphenoxy)phenyl]-as-triazine-3,5(2H,4H)dione (1.38 m mole), glacial acetic acid (3 ml.) and hydrogen peroxide (3 ml. of 30%) was refluxed for thirty minutes and then cooled. The solid product was filtered off, washed with water and dried in vacuo (496 mg). The product was recrystallized from acetic acid (452 mg); m.p. 234°–236°.C. MEC = 0.00038.

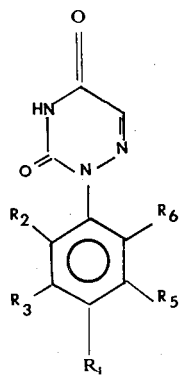

| $R_2$ | $R_3$ | $R_4$ | $R_5$ | $R_6$ | M.P. °C | MEC |
|---|---|---|---|---|---|---|
| H | $CH_3$ | $-O-(4SCH_3-C_6H_4)$ | $CH_3$ | H | 131–133 | 0.000019 |
| H | Cl | $-O-(4SCH_3-C_6H_4)$ | H | H | 185–187 | 0.00038 |
| H | $CH_3$ | $-O-(4SCH_3-C_6H_4)$ | H | H | 165–166 | 0.00038 |
| H | $CH_3$ | $-O-(3CH_3-4SCH_3-C_6H_3)$ | H | H | 168–169 | 0.00038 |
| H | Cl | $-O-(6BR-C_{10}H_6)$ | H | H | 236–238 | 0.00075 |
| H | Cl | $-O-(3CH_3-4SCH_3-C_6H_3)$ | H | H | 188–190 | 0.0015 |
| H | Cl | $-O-(3CH_3-4SCH_3-C_6H_3)$ | $CH_3$ | H | 148–149.5 | 0.0038 | from appropriate reactants according to procedures described herein and were tested for coccidiostatic activity.

In like manner, the following compounds were prepared from appropriate reactants and tested for coccidiostatic activity:

| $R_2$ | $R_3$ | $R_4$ | $R_5$ | $R_6$ | M.P.°C. | MEC |
|---|---|---|---|---|---|---|
| H | $CH_3$ | $-O-(4SO_2CH_3-C_6H_4)$ | H | H | 185–186.5 | 0.00038 |
| H | $CH_3$ | $-O-(3CH_3-4SO_2CH_3-C_6H_3)$ | H | H | 189–190 | 0.00075 |
| H | Cl | $-O-(3CH_3-4SO_2CH_3-C_6H_3)$ | H | H | 224–225 | 0.00075 |
| H | Cl | $-O-(3CH_3-4SO_2CH_3-C_6H_3)$ | $CH_3$ | H | 282–283 | 0.00075 |
| H | $CH_3$ | $-O-(3CH_3-4SO_2CH_3-C_6H_3)$ | $CH_3$ | H | 293–295 | 0.0015 |

EXAMPLE II

2-[3-Chloro-4-(4-Sulfonylmethylphenoxy)phenyl]-as-Triazine-3,5(2H,4H)Dione

A mixture of 2-[3-(chloro-4(4-

EXAMPLE III

2-[5-Chloro-4(2-Chloro-N-Cyclopropyl Benzenesulfonamido)-m-Toloxy]-as-Triazine-3,5(2H,4H)Dione 2-[3-Chloro-5-methyl-4(2-chlorophenoxy)phenyl]-as-triazine-3,5(2H,4H)dione (8.0 g) was added in small portions to chlorosulfonic acid (16 ml.) at room temperature. The mixture was stirred throughout the addition. When addition was complete, the mixture was heated to 60°–65°C. for 1 hour then cooled to room temperature and added dropwise to a stirred volume (250 ml.) of ice water. After one-half hour the product, 2-[3-chloro-5-methyl-4(2-chloro-4-chlorosulfonylphenoxy)phenyl]-as-triazine-3,5(2H,4H)dione, was recovered by filtration, washed with water, and dried in vacuo. Yield 10.5 g., m.p. 115°–120°C.

To a stirred solution of 2-(3-chloro-5-methyl-4-(2-chloro-4-chlorosulfonylphenoxy)phenyl)-as-triazine-3,5(2H,4H) dione (1.0 g.) in methylene chloride at room temperature was added cyclopropylamine (1.0 ml.). The resulting solution was stirred for one-half hour at room temperature and then evaporated to dryness. The residue was stirred with dilute hydrochloric acid (10.0 ml of 6N), and the resulting precipitate was filtered off and washed with water, and dried. It was recrystallized from ethanol; m.p. 208°–211°C.; MEC = 0.00075.

In like manner, the following compounds were prepared from appropriate reactants and were tested for coccidiostatic activity.

| $R_2$ | $R_3$ | $R_5$ | $R_6$ | $R_2'$ | $R_3'$ | $R_5'$ | $R_6'$ | $NR_1''R_2''$ | M.P.°C. | MEC |
|---|---|---|---|---|---|---|---|---|---|---|
| H | $CH_3$ | Cl | H | Cl | H | H | H | $N-(CH_3)_2$ | 282–284 | 0.0015 |
| H | $CH_3$ | Cl | H | Cl | H | H | H | $\overset{CH_3}{\underset{}{N}}-C_2H_5$ | 263–264 | 0.0015 |
| H | $CH_3$ | Cl | H | Cl | H | H | H | Morpholino | 246–249 | — |
| H | $CH_3$ | Cl | H | Cl | H | H | H | Piperidino | 246–248 | — |
| H | $CH_3$ | Cl | H | Cl | H | H | H | $\overset{H}{N}CH_2CH_2OCH_3$ | 179–185 | 0.0015 |
| H | $CH_3$ | Cl | H | Cl | H | H | H | $\overset{H}{N}-\text{Ph}$ | 143–146 | 0.012 |
| H | $CH_3$ | Cl | H | Cl | H | H | H | $\overset{H}{N}-(CH_2)_2CH_3$ | 139–142 | 0.0015 |
| H | $CH_3$ | Cl | H | Cl | H | H | H | $NH_2$ | 249–251 | 0.0015 |
| H | $CH_3$ | Cl | H | Cl | H | H | H | $\overset{H}{N}-C-(CH_3)_3$ | 238–240 | — |
| H | $CH_3$ | Cl | H | Cl | H | H | H | $\overset{H}{N}-CH_2CH=CH_2$ | 181–183 | — |
| H | $CH_3$ | Cl | H | Cl | H | H | H | $\overset{H}{N}-(CH_2)_2SCH_3$ | — | — |
| H | $CH_3$ | Cl | H | Cl | H | H | H | $\overset{H}{N}CH_2CH_2OH$ | 206 | — |
| H | $CH_3$ | Cl | H | Cl | H | H | H | $\overset{H}{N}(CH_2)_2OCOCH_3$ | 120 | — |
| H | $CH_3$ | Cl | H | Cl | H | H | H | $\overset{H}{N}(CH_2)_2O(CH_2)_2CH_3$ | 83 | — |
| H | $CH_3$ | Cl | H | Cl | H | H | H | $\overset{H}{N}-CH(CH_3)_2$ | 215–217 | — |
| H | $CH_3$ | Cl | H | Cl | H | H | H | $\overset{H}{N}-(CH_2)_2SO_2CH_3$ | 191–194 | — |
| H | $CH_3$ | Cl | H | Cl | H | H | H | Pyrrolidino | 285–288 | — |
| H | $CH_3$ | Cl | H | Cl | H | H | H | $N-(CH_2CH_2OH)_2$ | 239–241 | — |
| H | $CH_3$ | $CH_3$ | H | $CH_3$ | $CH_3$ | $CH_3$ | H | $N(CH_3)_2$ | 228–229 | 0.0007 |
| H | $CH_3$ | $CH_3$ | H | $CH_3$ | $CH_3$ | $CH_3$ | H | $\overset{CH_3}{\underset{}{N}}(C_2H_5)_2$ | 206–208 | 0.00075 |
| H | $CH_3$ | $CH_3$ | H | $CH_3$ | $CH_3$ | $CH_3$ | H | $\overset{H}{N}-C_2H_5$ | 206–207 | 0.00075 |
| H | $CH_3$ | $CH_3$ | H | $CH_3$ | $CH_3$ | $CH_3$ | H | $\overset{H}{N}-(CH_2)_2OCH_3$ | 216–217 | 0.0007 |
| H | $CH_3$ | $CH_3$ | H | $CH_3$ | $CH_3$ | $CH_3$ | H | $\overset{H}{N}-\triangleleft$ | 140–143 | 0.00075 |
| H | $CH_3$ | $CH_3$ | H | $CH_3$ | $CH_3$ | $CH_3$ | H | Pyrrolidino | 203–207 | 0.0015 |
| H | $CH_3$ | $CH_3$ | H | $CH_3$ | $CH_3$ | $CH_3$ | H | $NCH_2CH_2CH_3$ | 220–224 | 0.00075 |
| H | $CH_3$ | $CH_3$ | H | $CH_3$ | $CH_3$ | $CH_3$ | H | $\overset{H}{N}-(CH_2CH_2CH_3)_2$ | 199–202 | 0.0015 |
| H | $CH_3$ | $CH_3$ | H | $CH_3$ | $CH_3$ | $CH_3$ | H | $\overset{H}{N}-CH_2CH_2SCH_3$ | 151 | — |

—Continued

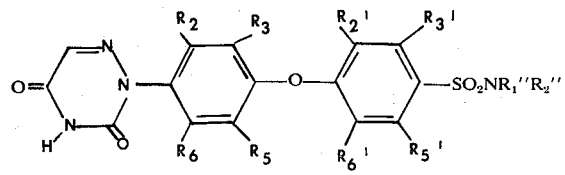

| $R_2$ | $R_3$ | $R_5$ | $R_6$ | $R_2'$ | $R_3'$ | $R_5'$ | $R_6'$ | $NR_1''R_2''$ | M.P.°C. | MEC |
|---|---|---|---|---|---|---|---|---|---|---|
| H | $CH_3$ | $CH_3$ | H | $CH_3$ | $CH_3$ | $CH_3$ | H | $\underset{H}{\overset{CH_3}{N}}$—$CH_2CH=CH_2$ | 153–155 | — |
| H | $CH_3$ | $CH_3$ | H | $CH_3$ | $CH_3$ | $CH_3$ | H | $\underset{H}{N}$—$CH_2CH_2OH$ | 228–232 | — |
| H | $CH_3$ | $CH_3$ | H | $CH_3$ | $CH_3$ | $CH_3$ | H | $\underset{H}{N}$—$(CH_2)_2SO_2CH_3$ | 213–217 | — |
| H | $CH_3$ | $CH_3$ | H | $CH_3$ | $CH_3$ | $CH_3$ | H | $\underset{}{N}$—$(CH_2)_3OCH_2$—$CH_2OCH_3$ | 100 | — |
| H | $CH_3$ | $CH_3$ | H | $CH_3$ | $CH_3$ | $CH_3$ | H | $\underset{(CH_2)_2-OH}{N(CH_2)_2OH}$ | 220–222 | — |
| H | $CH_3$ | Cl | H | $CH_3$ | $CH_3$ | $CH_3$ | H | $NH_2$ | 250–255 | — |
| H | $CH_3$ | Cl | H | $CH_3$ | $CH_3$ | $CH_3$ | H | $\underset{H}{\overset{CH_3}{N}}$—$CH_2CH=CH_2$ | 138 | — |
| H | $CH_3$ | Cl | H | $CH_3$ | $CH_3$ | $CH_3$ | H | $\underset{CH_3}{N}$—$CH_3$ | 151–154 | — |
| H | $CH_3$ | Cl | H | $CH_3$ | $CH_3$ | $CH_3$ | H | $\underset{H}{N}$—$CH_3$ | 151 | — |
| H | $CH_3$ | Cl | H | $CH_3$ | $CH_3$ | $CH_3$ | H | $\underset{H}{N}$—$CH_2CH_3$ | 160–164 | — |
| H | $CH_3$ | Cl | H | $CH_3$ | $CH_3$ | $CH_3$ | H | $\underset{H}{N}$—$(CH_2)_2OCH_3$ | 196–200 | — |
| H | $CH_3$ | Cl | H | $CH_3$ | $CH_3$ | $CH_3$ | H | $\underset{H}{N}$—$CH_2CH_2OH$ | 188–193 | — |
| H | $CH_3$ | Cl | H | $CH_3$ | $CH_3$ | $CH_3$ | H | $\underset{H}{N}$—$CH_2CH_2SCH_3$ | 170–174 | — |
| H | $CH_3$ | Cl | H | $CH_3$ | $CH_3$ | $CH_3$ | H | $\underset{CH_2CH_3}{N}$—$(CH_2)_2OCOCH_3$ | 175 | — |
| H | $CH_3$ | Cl | H | $CH_3$ | $CH_3$ | $CH_3$ | H | $\underset{H}{N}$—$CH_2CH_3$ | 202–204 | — |
| H | $CH_3$ | Cl | H | $CH_3$ | $CH_3$ | $CH_3$ | H | $\underset{H}{N}$—$CH_2CH_2CH_3$ | 164 | — |
| H | $CH_3$ | Cl | H | $CH_3$ | $CH_3$ | $CH_3$ | H | Pyrrolidino | 145 | — |
| H | $CH_3$ | Cl | H | $CH_3$ | $CH_3$ | $CH_3$ | H | $\underset{H}{\overset{CH_3}{N}}$—$CH_2CH_3$ | 153 | — |
| H | $CH_3$ | Cl | H | $CH_3$ | $CH_3$ | $CH_3$ | H | $\underset{H}{N}$—$(CH_2)_3CH_3$ | 156–158 | — |
| H | $CH_3$ | Cl | H | $CH_3$ | $CH_3$ | $CH_3$ | H | $\underset{H}{N}$—$CH$—$(CH_3)_2$ | 150–152 | — |
| H | $CH_3$ | Cl | H | $CH_3$ | $CH_3$ | $CH_3$ | H | $\underset{H}{N}$—◁ | 238–243 | — |
| H | $CH_3$ | Cl | H | $CH_3$ | $CH_3$ | $CH_3$ | H | $\underset{H}{N}$—$(CH_2)_3O(CH_2)_2OCH_3$ | 115 | — |
| H | $CH_3$ | Cl | H | $CH_3$ | $CH_3$ | $CH_3$ | H | $\underset{H}{N}$—$(CH_2)_2SO_2CH_3$ | 183 | — |
| H | $CH_3$ | Cl | H | $CH_3$ | $CH_3$ | $CH_3$ | H | $N(CH_2CH_2OH)_2$ | 138–141 | — |
| H | $CH_3$ | Cl | H | $CH_3$ | H | H | H | $N$—$(C_2H_5)_2$ | 250–252 | 0.0015 |
| H | $CH_3$ | Cl | H | $CH_3$ | H | H | H | $N$—$(CH_3)_2$ | 271–275 | 0.00075 |
| H | $CH_3$ | Cl | H | $CH_3$ | H | H | H | Morpholino | 252–254 | 0.0015 |
| H | $CH_3$ | Cl | H | $CH_3$ | $CH_3$ | H | H | $N$—$(C_2H_5)_2$ | 264–265 | — |
| H | $CH_3$ | Cl | H | Cl | H | H | H | $NH$—$(CH_2)_3CH_3$ | 167–168 | — |
| H | $CH_3$ | $CH_3$ | H | $CH_3$ | $CH_3$ | $CH_3$ | H | $NH$—$CH_2$—$CH_2$—$OCOCH_3$ | 137 | — |

EXAMPLE IV

A. 3,5-Dimethyl-4-(4-Bromobenzyloxy)-Nitrobenzene

To a slurry of the potassium salt (18.4 g.) of 3,5-dimethyl-4-nitrophenol in dry acetone (100 ml.) containing a catalytic amount of potassium iodide (20 mg.) was added dropwise a solution of p-bromobenzyl bromide (24.9 g., 0.1 mole) in dry acetone (20 ml.) over a period of one-half hour. After the addition was complete, the reaction mixture was refluxed for 2 hours and then cooled. The precipitated solid was filtered off, washed with water and dried. Yield 31.5 g., M.P. 106–109°C.

B. 3,5-Dimethyl-2-(4-Bromobenzyloxy)Aniline

To a stirring mixture of iron filings (115 g.) in acetic acid (100 ml.) and water (200 ml.) heated on a steam-bath was added portionwise 3,5-dimethyl-4-(4-bromobenzyloxy)-nitrobenzene (31.2 g., 0.93 mole). After the addition was complete, the reaction mixture was heated for additional 2 hours. The hot reaction mixture was neutralized with sodium bicarbonate and filtered. The filter cake was washed several times with water. This cake was extracted with hot ethanol and the organic extract was evaporated to yield a white crystalline solid. Yield 22.9 g., M.P. 58°–60°C.

C. 3,5-Dimethyl-4-(4-Bromobenzyloxy)-Phenylyrazonocyanoacetylurethan

To a solution of 3,5-dimethyl-4-(4-bromobenzyloxy)aniline (56.2 g., 0.184 mole) in acetic acid (970 ml.) and concentrated hydrochloric acid (75 ml.) maintained at 0–5°C. was added dropwise a solution of sodium nitrite (13.94 g. in 15 ml. of water). After the addition was complete, a mixture of cyanoacetylurethan (31.51 g., 0.202 mole) and anhydrous sodium acetate (37.72 g., 0.46 mole) was added in one portion and the mixture stirred for 2 hours. The granular yellow precipitate was filtered off, washed with water and dried. Yield 65 g., M.P. 181°–185°C.

D. 2-[3,5-Dimethyl-4-(4-Bromobenzyoxy)Phenyl]-as-Triazine-3,5(2H,4H)-Dione-6-Carbonitrile A solution of the above hydrazone (65.0 g., 0.142 mole) in acetic acid (800 ml.) and sodium acetate (11.6 g.) was refluxed for 4 hours then cooled and poured onto water (4 liters) and allowed to granulate for 6 hours. The solid was filtered off, washed with water and dried. The resulting product was crystallized from a mixture of methylene chloride and hexane. Yield 46.2 g., M.P. 188°–190°C.

E. 2-[3,5-Dimethyl-4-(4-Bromobenzyloxy)Phenyl]-as-Triazine-3,5(2H,4H)-Dione-6-Carboxylic Acid To a solution of potassium hydroxide (30.6 g.) in ethylene glycol (435 ml.) and water (12 ml.) was added the above obtained carbonitrile (33.8 g., 0.079 mole) and the mixture was heated at 125°C. for 3 hours. The solution was cooled to room temperature and poured onto 2 liters of ice-water and acidified to pH 2.0 with concentrated hydrochloric acid. The precipitated solid was filtered off and washed with water and dried. Yield 18.5 g., M.P. 185°C. This compound was decarboxylated according to the procedure described previously to obtain 2-[3,5-dimethyl-4-(4-bromobenzyoxy)phenyl]-as-triazine-3,5(2H,4H)dione, M.P. 188°–189°C., MEC = 0.00075.

The following compounds were similarly prepared from appropriate reactants according to known procedures, many of which are described herein and they were then treated for coccidiostatic activity.

| $R_2$ | $R_6$ | $R_3$ | $R_5$ | $R_4$ | M.P.°C. | MEC |
|---|---|---|---|---|---|---|
| H | H | $CH_3$ | $CH_3$ | $-OCH_2-(4Cl-C_6H_4)$ | 168–169 | 0.0015 |
| H | H | $CH_3$ | $CH_3$ | $-OCH_2-(4SO_2CH_3-C_6H_4)$ | 228–231 | 0.0015 |
| H | H | Cl | H | $-OCH_2-(2,4-Cl-C_6H_3)$ | 214–215 | 0.006 |

What is claimed is:
1. A compound of the formula:

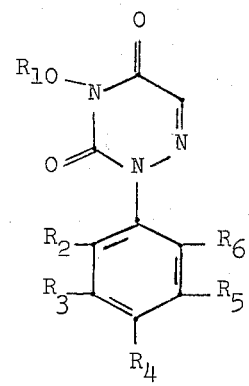

and the alkali metal and alkaline earth metal salts thereof wherein:
each of $R_2$ and $R_6$ is hydrogen, fluoro, chloro, cyano, or methyl; with the proviso that at least one of $R_2$ and $R_6$ is hydrogen or fluoro;

each of $R_3$ and $R_5$ is hydrogen, cyano, trifluoromethyl, halogen, lower alkyl, lower alkoxy, lower alkylthio, or nitro;

$R_4$ is

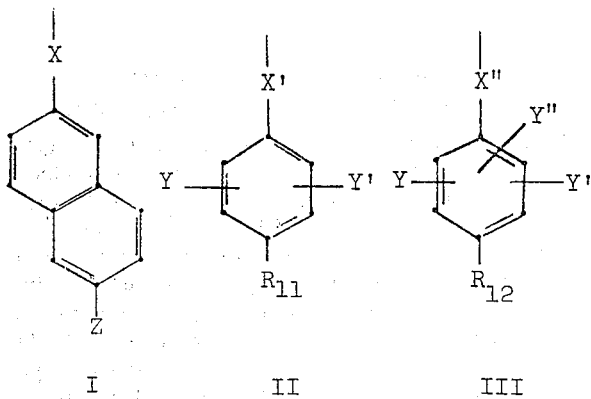

or $-CH_2-NR_{13}R_{14}$ wherein Z is hydrogen, lower alkylthio, or halogen;

Y, Y' and Y'' are each hydrogen, halogen, lower alkyl, or trifluoromethyl;

X is oxygen, sulfur, or $-OCH_2-$;

X' is $-OCH_2-$, $-SCH_2-$, $-SOCH_2-$, $-SO_2CH_2-$, or $-CH_2-$, $-OCH_2-CO-$,

X'' is oxygen, sulfur, SO, $SO_2$, >C=O, or $-CHOH-$;

$R_{10}$ is hydrogen;

$R_{11}$ is hydrogen, halogen, lower alkylthio, lower alkylsulfinyl, lower alkylsulfonyl, lower alkoxy, trifluoromethyl, or nitro;

$R_{12}$ is lower alkylthio, lower alkylsulfinyl, lower alkylsulfonyl, trifluoromethyl, lower alkanoyl or $SO_2NRR_1'$ wherein R is hydrogen, lower alkyl, allyl, propargyl, phenyl, benzyl, p-chlorophenyl, β-hydroxyethyl, β-acetoxyethyl, β-methoxyethyl, β-methylthioethyl, β-methylsulfonylethyl, or cyclopropyl;

$R_1'$ is hydrogen, lower alkyl, allyl, propargyl, β-hydroxyethyl, β-acetoxyethyl, β-methoxyethyl, β-methylthioethyl, β-methylsulfonylethyl, γ-(β-methoxy-ethoxy)-propyl, cyclopropyl, or cyclopentyl;

and wherein R and $R_1'$ when taken together with the nitrogen to which they are attached complete a morpholino or pyrrolidino ring; and $R_{13}$ and $R_{14}$ taken together with the nitrogen to which they are attached complete a morpholino, thiomorpholino, or thiazolidino ring.

2. A compound according to claim 1 wherein $R_4$ is of the formula:

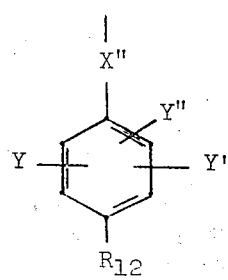

3. A compound according to claim 2 wherein X'' is oxygen.

4. A compound according to claim 3 wherein $R_{12}$ is $-SCH_3$.

5. A compound according to claim 4 wherein $R_2$, $R_6$, Y and Y' are each hydrogen, $R_3$ and $R_5$ are each methyl, and Y'' is meta-methyl.

6. A compound according to claim 3 wherein $R_{12}$ is $-SO_2NRR_1'$.

7. A compound according to claim 6 wherein R and $R_1'$ are each lower alkyl.

8. A compound according to claim 7 wherein R, $R_1'$, $R_2$, and $R_6$ are each hydrogen; $R_5$, Y, Y', and Y'' are each methyl, and $R_3$ is chloro.

9. A compound according to claim 7 wherein R is methyl, $R_1'$ is ethyl, $R_2$, $R_6$, Y', and Y'' are each hydrogen, $R_3$ is chloro, Y is ortho-chloro, and $R_5$ is methyl.

10. A compound according to claim 7 wherein R, $R_5$, Y, Y', and Y'' are each methyl, $R_1'$ is ethyl, $R_3$ is chloro, and $R_2$ and $R_6$ are each hydrogen.

11. A compound according to claim 7 wherein R and $R_1'$ are each ethyl, $R_2$ and $R_6$ are each hydrogen, and $R_3$, $R_5$, Y, Y', and Y'' are each methyl.

12. A compound according to claim 6 wherein R is hydrogen, $R_1'$ is cyclopropyl, $R_2$, $R_6$, Y', and Y'' are each hydrogen, $R_3$ is chloro, Y is ortho-chloro, and $R_5$ is methyl.

13. A compound according to claim 6 wherein R, $R_2$, $R_6$, and Y'' are each hydrogen, $R_1'$ is cyclopropyl, and $R_3$, $R_5$, Y and Y' are each meta-methyl.

14. A compound according to claim 6 wherein R is β-methoxyethyl, $R_1'$, $R_2$, and $R_6$ are each hydrogen, $R_5$, Y, Y', and Y'' are each methyl, and $R_3$ is chloro.

15. A compound according to claim 6 wherein R is β-methylthioethyl; $R_1'$, $R_2$, and $R_6$ are each hydrogen; and $R_3$, $R_5$, Y, Y', and Y'' are each methyl.

16. A compound according to claim 6 wherein R is methyl; $R_1'$ is ethyl; $R_3$ is chloro; $R_5$ is methyl; Y is ortho ethyl; and $R_2$, $R_6$, Y' and Y'' is each hydrogen.

17. A compound according to claim 3 wherein $R_{12}$ is $-COCH_3$; $R_3$ is chloro; $R_5$ is methyl; $R_2$, $R_6$, Y, Y' and Y'' are each hydrogen.

18. A compound according to claim 1 wherein $R_4$ is of the formula:

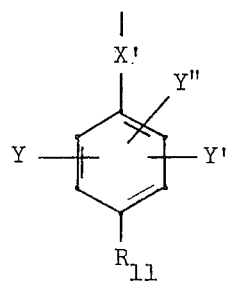

19. A compound according to claim 18 wherein X' is $-OCH_2-$.

20. A compound according to claim 19 wherein $R_3$ is hydrogen or lower alkyl, $R_5$ is lower alkyl or halogen, Y, Y', and Y'' are each hydrogen, halogen or lower alkyl and $R_{11}$ is halogen or $-SO_2CH_3-$.

21. A compound according to claim 1 wherein $R_4$ is of the formula:

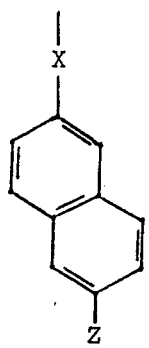

22. A compound according to claim 21 wherein X is oxygen.
23. A compound according to claim 21 wherein X is sulfur.
24. A compound according to claim 22 wherein Z is halogen.
25. A compound according to claim 24 wherein Z is bromo, $R_2$, $R_3$, and $R_6$ is each hydrogen, and $R_5$ is chloro.
26. A compound according to claim 1 wherein $R_4$ is —$CH_2$—$NR_{13}R_{14}$.
27. A compound according to claim 26 wherein $R_2$ and $R_6$ are each hydrogen, $R_3$ and $R_5$ are each methyl, and $R_{13}$ and $R_{14}$ together with the nitrogen to which they are attached complete a morpholino ring.

* * * * *